United States Patent [19]

Schmitt

[11] 4,011,710
[45] Mar. 15, 1977

[54] BALER WITH DOUBLE-ACTING PLUNGER

[76] Inventor: Helwig Schmitt, Raiffeisenstrasse 5, 3523 Grebenstein near Kassel, Germany

[22] Filed: Oct. 23, 1974

[21] Appl. No.: 517,129

[30] Foreign Application Priority Data

Oct. 25, 1973 Germany .......................... 2353381

[52] U.S. Cl. ............................. 56/341; 100/186; 100/209; 100/189
[51] Int. Cl.² ...................... B30B 1/06; B30B 9/38
[58] Field of Search ........... 100/185, 186, 209, 188, 100/189, 98; 56/341–343

[56] References Cited
UNITED STATES PATENTS

| | | | |
|---|---|---|---|
| 1,029,422 | 6/1912 | Cashon | 100/186 X |
| 2,342,964 | 2/1944 | Openshaw | 100/186 |
| 2,587,997 | 3/1952 | Guettler | 100/186 |
| 3,508,486 | 4/1970 | Polich | 100/98 R |
| 3,802,337 | 4/1974 | St-Hiliare | 100/98 |

*Primary Examiner*—Peter Feldman
*Attorney, Agent, or Firm*—Robert L. Farris

[57] ABSTRACT

A hay baler having two bale chambers arranged end to end in a straight line and a single plunger reciprocating in both chambers. Drive for the plunger may be by cranks and connecting rods on each side of the plunger or by a planetary gear train driving a crankshaft.

1 Claim, 10 Drawing Figures

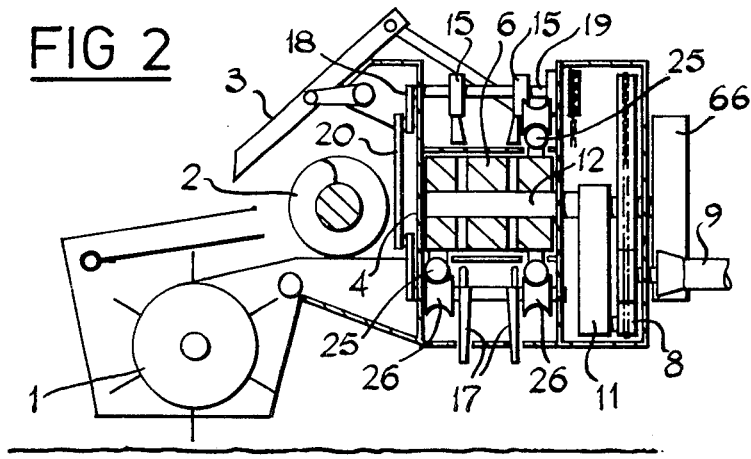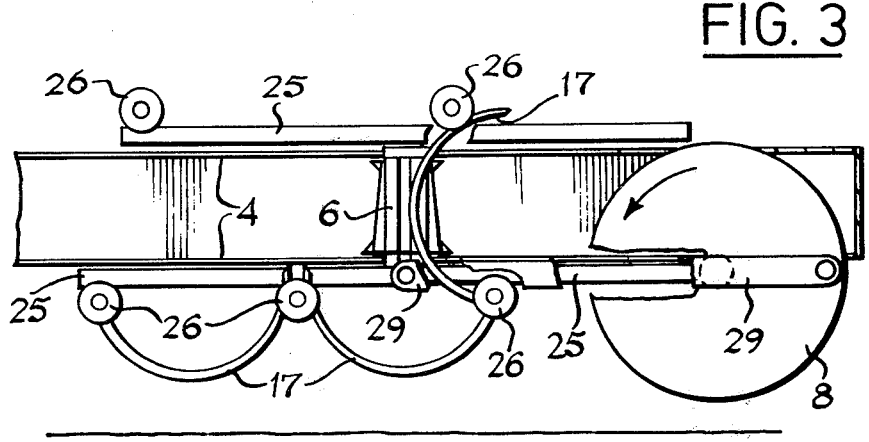

BALER WITH DOUBLE-ACTING PLUNGER

This invention relates to balers in which a plunger reciprocates in a bale chamber and acts to compress material, for example hay straw or waste material from industrial processes, which is fed into the bale chamber.

In prior United Kingdom Patent Specification No. 999,027 there is proposed a hay baler in which the plunger of a baler is mounted for oscillation in an arc between the open ends of two bale chambers. In this manner the plunger is arranged to be double acting and acts to compress, first in one bale chamber and then in the other, crop material fed into the gap between the bale chambers.

However, the arrangement disclosed in the said prior patent leads to problems associated with driving and guiding the plunger during its movement and it is an aim of the present invention to provide improvements in this respect.

According to the invention there is provided a baler comprising:
two bale chambers,
feed means, the feed means being capable of feeding material to be baled into said bale chambers;
a plunger;
drive means for said plunger, the drive means being capable of reciprocating said plunger so that said plunger alternately compresses said material in one bale chamber and then in the other bale chamber;
characterized by a guide for said plunger capable of guiding said plunger for reciprocating movement in a straight line.

Embodiments of the invention will now be described by way of example with reference to the accompanying drawings in which:

FIG. 2 shows the baler of FIG. 1 in side elevation;

FIG. 3 shows a view from the rear, of a portion of the baler of FIGS. 1 and 2, including a plunger and needles;

FIG. 4 shows a view of part of a further embodiment, the view being, in the same direction as in FIG. 2, and showing a plunger in a bale chamber and a modified drive for the plunger;

FIG. 5 shows another drive for the plunger of FIG. 4;

Figure 1:
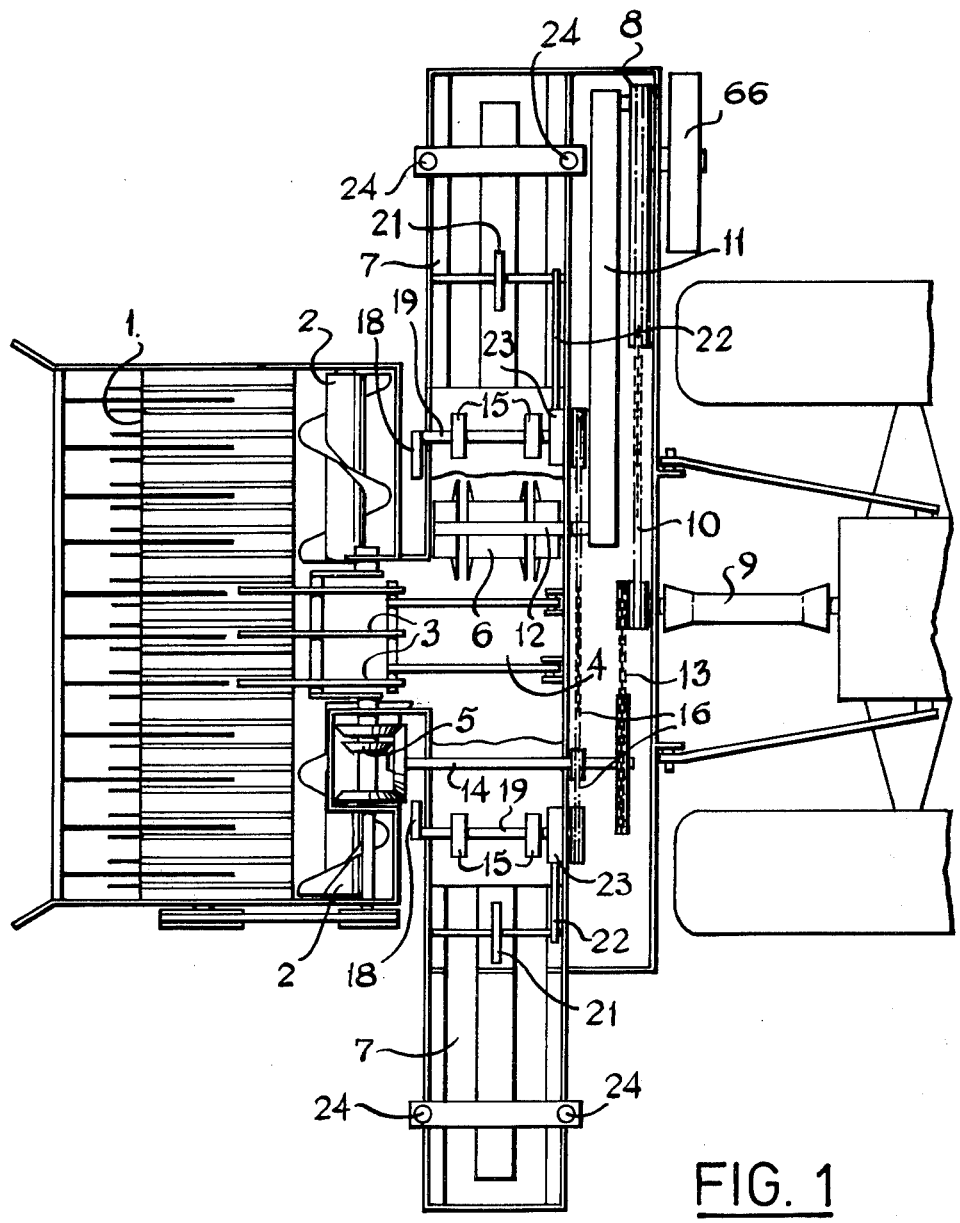
FIG. 1 is a plan view of a baler mounted at the front of a tractor.

As shown in FIGS. 1 to 3 of the drawings, a baler comprises a pick up device 1, a pair of augers 2 and feed means in the form of a packer 3 to feed crop material picked-up by the device 1 into a duct 4 linking two bale chambers 7 arranged in a straight line.

A plunger 6 reciprocates through duct 4 into each of the bale chambers 7 in turn. The drive 5 of packer 3 is synchronized with that of the plunger so that crop material is fed into duct 4 as soon as the plunger has moved past the packer into each bale chamber.

The baler is driven by a shaft 9 connected to the tractor. A chain 10 drives a rotatable crank member 8 which is connected to a drive member or gudgeon pin 12 projecting from plunger 6, by a connecting rod 11. A flywheel 66 is connected to crank member 8 through a high ratio drive (not shown) to reduce the maximum torque required from the drive to shaft 9.

The other apparatus of the baler is driven from shaft 9 by a chain 13 through a counter shaft 14. Shaft 14 is coupled through the bevel drive 5 to packer 3 augers 2, and pick-up 1. Double or single chains 16 transmit drive from counter shaft 14 to two sets of binding and tying apparatus 15 including respective cross shafts 19 carrying cranks 18 to drive needles 17 through tie rods 20.

Bale length measuring wheels 21 are provided for each bale chamber 7 and actuate the respective binding apparatus 15 through connecting rods 22 and clutches 23 in the drive to the binding apparatus, so as to produce bales of the desired length.

Bale density is controlled in the usual manner by means of screw threaded adjusters 24 which can be caused to change the cross-sectional area of the bale chambers 7 at their discharge ends.

Plunger 6 is provided with a guide whereby it is guided for reciprocating movement in a straight line. The guide is located outside bale chambers 7 and, as shown in FIGS. 2 to 4, comprises one upper guide member 25 and two spaced lower guide members 25 fixed to the plunger. The guide members are in the form of cylindrical rods and co-operate with a series of waisted spaced rollers 26 which are vertically and laterally adjustable to adjust the position of the plunger. This arrangement allows the plunger to be guided effectively as it passes through duct 4 without providing fixed rails which would interfere with the operation of packer 3. Within the bale chambers 7, plunger 6 is self guiding.

In use, crop picked up by the pick-up device 1 is fed by augers 2 towards packer 3 which feeds it into duct 4. Plunger 6 compresses the material in one of bale chambers 7. While the plunger is in said one bale chamber packer 3 feeds more material into duct 4 whereupon the plunger returns and compresses this latter batch of material in the other bale chamber. Thus packer 3 feeds a batch of crop material into duct 4 for every half turn of crank member 8.

The drive 5 of packer 3 is provided with alternatively usable bevel gears whereby the speed of the packer may be halved so that it feeds material into duct 4 only once in every complete turn of the plunger drive crank. In this way, plunger 6 compresses material only in one of the bale chambers 7. The synchronization of the packer and plunger drives allows either of the bale chambers to be used during such one way action of plunger 6, according to choice. This facility is often useful during the first pass of the baler in any given field in order to discharge bales on one selected side of the baler only.

The embodiments of FIGS. 4 and 5 will now be described.

In these embodiments, the main difference from the embodiment described above is that the plungers 6 are driven from both sides instead of from one side only. Two rotary crank members 8, 28 are provided one on each side of the bale chambers assembly and are drivably interconnected by a shaft 27. In the FIG. 4 version the crank members are connected to plunger 6 by connecting rods 29 on each side of the bale chambers. The connecting rods are pivotally connected to a drive member in the form of a transverse rod 29a extending through and fixed to the lower guide members 25. In this way the front connecting rod 29 does not interfere with the operation of packer 3.

In the FIG. 5 version a similar effect is achieved by the use of cranked connecting rods 30 to connect the cranks 8, 28 to the central drive member 12 on plunger 6. This also avoids interference with packer 3 and the flow of crop into duct 4.

Figure 6:
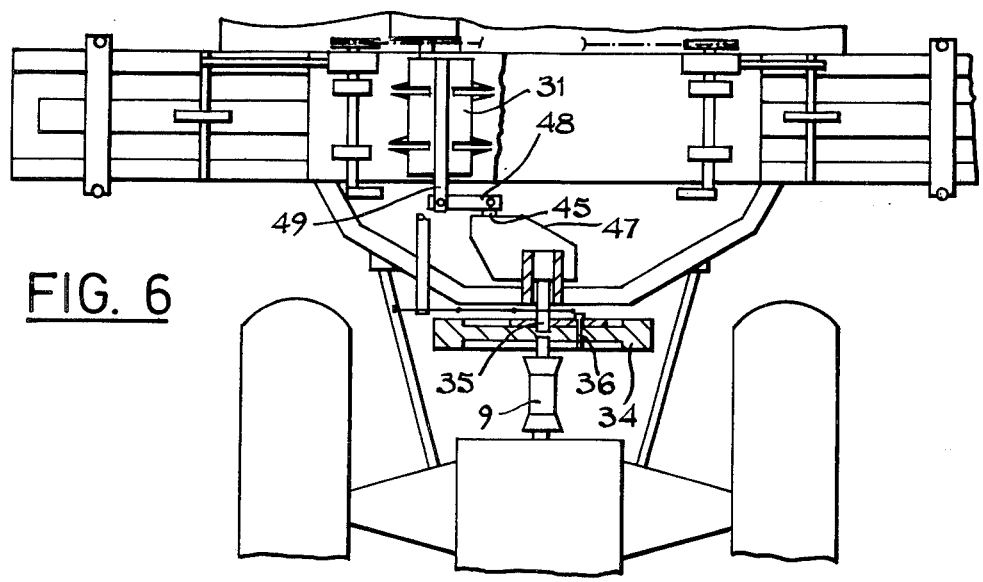
FIG. 6 shows a plan view of a further embodiment, incorporating a planetary drive for the plunger.
Figure 7:
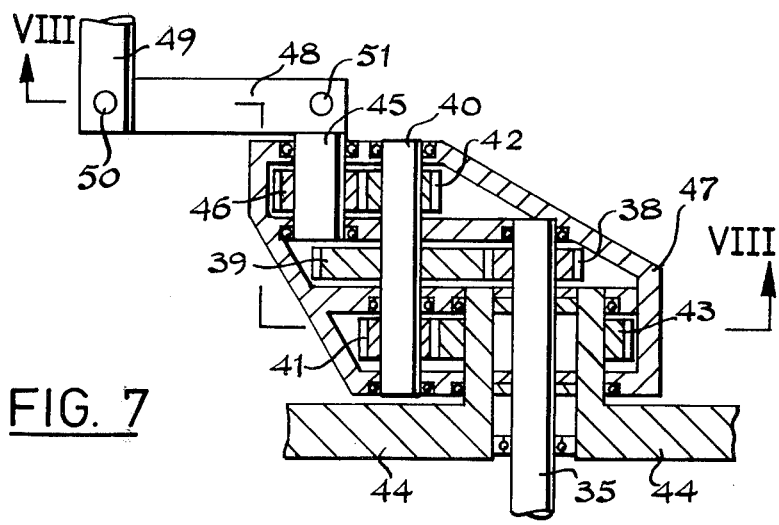
FIG. 7 shows a section through a gearbox forming part of the drive of FIG. 6.
Figure 8:
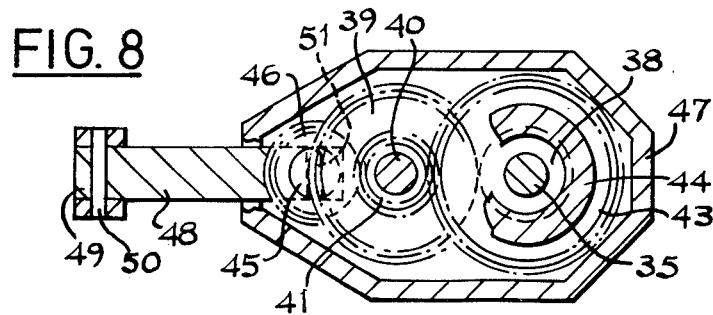
FIG. 8 shows, somewhat diagrammatically, a section through the gearbox of FIG. 7 on the line VIII—VIII therein.

The embodiment of FIGS. 6 to 8 will now be described.

The general structure and arrangement of this embodiment is similar to that of the embodiment described above, but it differs therefrom in the drive for the plunger 31.

The baler drive input shaft 9 is connected directly to a torque-reducing flywheel 34 rotatably mounted on a shaft 35. Drive is transmitted from the flywheel to shaft 35 by a lever 37 fixed thereto and connected to the flywheel by a shear bolt 36.

Shaft 35 is the drive input shaft of a gearbox 47 having a planetary gear train through which an output crank shaft 45 is driven.

Gearbox 47 comprises a gear wheel 38 fixed to shaft 35 and meshing with a larger gear wheel 39 fixed to a countershaft 40. Countershaft 40 has fixed thereto a pair of end gear wheels 41 and 42. Gear wheel 41 meshes with a ring gear wheel 43 fixed to an annular inwardly-projecting flange integral with the gearbox housing and co-axial with shaft 35. Gear wheel 42 meshes with a gear wheel 46 fixed to output crank shaft 45.

Crank shaft 45 is connected to a drive member 49 projecting from plunger 31 by a connecting rod 48 having pivot pins 50, 51, one at each end.

An important feature of gearbox 47 is that the axis of crank shaft 45 lies midway between the axis of pivot pin 50 and the axis of rotation of input shaft 35. Also, the transmission ratio between gear wheel 46 and fixed annular gear 43 is 1 to 2 i.e. assuming gear wheels 41 and 42 are of the same size as each other, gear 43 has twice as many teeth as gear wheel 46.

In use, drive is transmitted to countershaft 40 through gearwheels 38, 39. Rotation of the countershaft 40 causes gear wheel 41 to move round the axis of fixed annular gear 43 thereby setting the entire gearbox 47 in rotation about said axis. Rotation of countershaft 40 also causes gear wheel 42 to transmit drive through gear wheel 46 to output crankshaft 45.

Thus, the motion imparted to crankshaft 45 is rotation in one direction (with the whole gearbox) about the axis of input shaft 35, and rotation in the opposite direction about its own axis i.e. crankshaft 45 behaves as if its gear wheel 46 were itself in mesh with fixed gear 43 and were caused to rotate about the axis thereof. This, together with the interaxial distances and the transmission ratio referred-to above results in plunger 31 being reciprocated between limit positions, one of which is shown in FIG. 6, in which it is equally spaced from the axis of shaft 35. If gearbox 47 simply acted as a mechanical crank member instead of as described above, the travel of the plunger would be reduced by twice the effective length of connecting rod 48. Thus a very compact drive is provided for the plunger.

The number of strokes per minute of plunger 31 for any given rate of rotation of input shaft 35 depends on the relative sizes of gear wheels 38, 39. In the above embodiment rotation of shaft 35 at 540 revolutions per minute produces 90 strokes per minute of the plunger.

Figure 9:
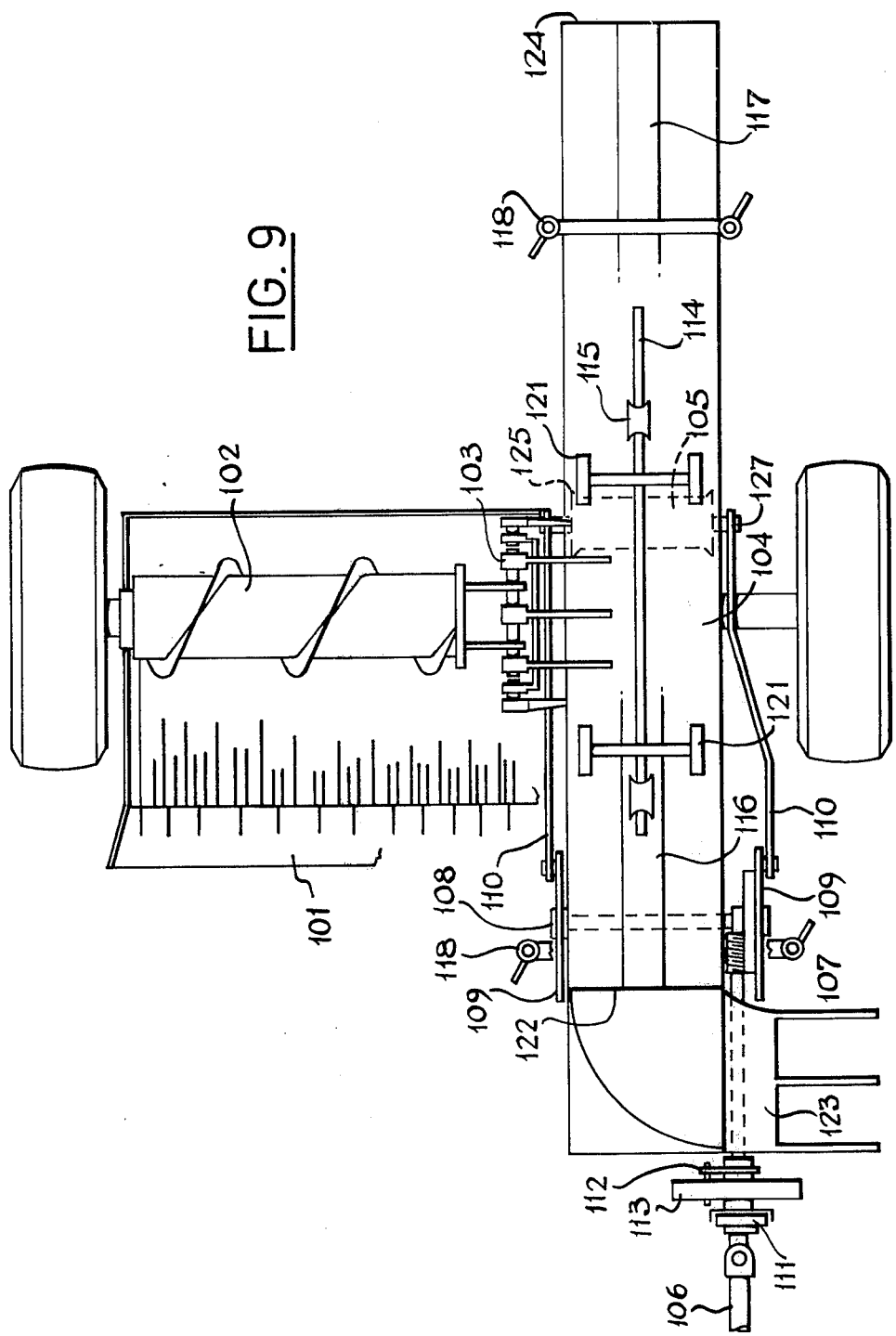
FIG. 9 shows a plan view of a trailed baler forming a further embodiment of the invention.
Figure 10:
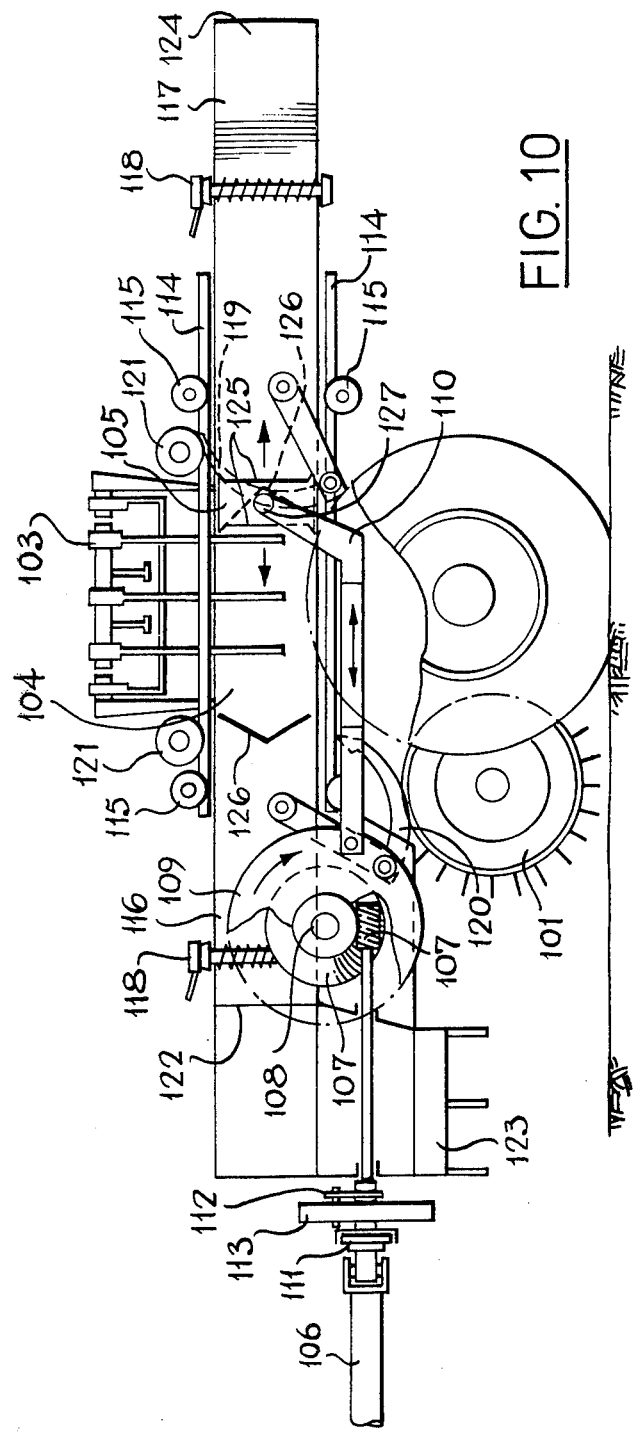
FIG. 10 shows the baler of FIG. 9 as seen in side elevation.

FIGS. 9 and 10 show a trailed baler in which the direction of plunger movement is parallel to the direction of forward movement of the implement.

The baler comprises a pickup 101 which feeds crop to an auger 102. A crank-driven feed means or packer 103 feeds crop into a duct 104 between two bale chambers extending in the fore/aft direction in which a plunger 105 reciprocates.

The plunger is driven from an input shaft 106 through a friction clutch 111, a flywheel 113, a shear bolt and lever arm 112, bevel gears 107, and a main countershaft 108. A pair of crank members 109 are mounted one on each end of shaft 108 and drive each side of the plunger by means of respective cranked connecting rods 110 connected to a drive member 127 projecting on each side of the plunger. One revolution of shaft 108 produces one double stroke of plunger 105. The use of a cranked connecting rod on the feed-in side of the duct 104 avoids any interference with packer 103.

To produce well shaped bales, plunger 105 has two knives 125 which co-operate with V-shaped fixed knives 126 on the bale chambers. The V-shape of these knives allows effective crop cutting without interference with the laterally projecting plunger drive member 127.

The plunger is guided in its reciprocating movement by upper and lower guide rods 114 fixed thereto and associated rollers 115 mounted on the baler frame.

Bale density is adjustable as in previous embodiments by conventional adjustment devices 118 by which the discharge openings provided by the discharge end portions 116, 117 of the bale chambers may be changed in size.

Bales are bound with twine or the like by means of needles shown as 119 in their crop penetrating position and as 120 in their lowered position, and by means of knotters 121. The bales are discharged rearwardly through an outlet 124 and sideways through an outlet 123.

The principal advantages of the embodiments of the invention which have been described above include the following:

1. Double the rate of output of conventional balers. This is a result of the double action of the plunger.

2. Use of linear bale chambers allows use of a simple crank and connecting rod drive to the plunger. The linear plunger movement simplifies guidance of the plunger and improves the shearing action of the plunger knives.

3. The compact plunger drive of FIGS. 6 7 and 8 allows the machine to be comparatively small in size.

4. Transmission of drive to both sides of the plunger allows the production of high density bales.

In this specification the term "bale chamber" is used to mean the chamber in which crop material is compressed within a baler by a reciprocating plunger. No distinction is therefore drawn between that portion of such a chamber which lies within the travel of the plunger and that part (sometimes referred-to as a bale former) which lies beyond the plunger travel.

I claim:

1. A hay baler comprising a mobile frame, a hay pickup mounted on one side of the mobile frame, a pair of generally fore and aft extending bale chambers having common generally straight top, bottom and side walls, mounted on the side of the frame adjacent to the hay pickup, a hay inlet aperture in one side wall of the bale chambers substantially mid-way between the ends of the wall, feed means to feed hay from the hay pickup through the hay inlet aperture, a plunger moveably supported in the bale chambers, plunger guide means mounted on the top and bottom walls for guiding the plunger in a generally fore and aft straight line, drive means for reciprocating the plunger back and forth so that it alternately moves hay to the rear and compresses it in one of the bale chambers and then moves hay to the front and compresses it in the second bale chamber, said drive means including a shaft rotatably mounted adjacent to the bottom wall of the bale chambers, drive means to rotate the shaft, a crank member mounted on the shaft adjacent to each side wall, the forward bale chamber having a connecting rod connected to each of the crank members and a trunion projecting from each side of the plunger and the adjacent side wall of the bale chambers, the connecting rod on the side of the bale chambers adjacent to the hay pickup including a generally horizontal portion and a generally vertical portion which leave the hay inlet aperture in one side wall of the bale chamber unobstructed when the plunger moves into the rear bale chamber, and drive means to drive said feed means to feed hay from the hay pickup through the hay inlet aperture each time the plunger moves into the rear bale chamber and each time the plunger moves into the forward bale chamber.

* * * * *